(12) United States Patent
Lu et al.

(10) Patent No.: US 11,323,901 B2
(45) Date of Patent: May 3, 2022

(54) METHODS AND NETWORK NODES FOR MANAGING TRANSMISSION OF AT LEAST ONE CHANNEL QUALITY REPORT

(71) Applicant: Telefonaktiebolaget LM Ericsson (publ), Stockholm (SE)

(72) Inventors: Qianxi Lu, Beijing (CN); Rui Fan, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 12 days.

(21) Appl. No.: 15/965,157

(22) Filed: Apr. 27, 2018

(65) Prior Publication Data

US 2018/0249363 A1      Aug. 30, 2018

Related U.S. Application Data

(63) Continuation of application No. 14/399,231, filed as application No. PCT/CN2012/076256 on May 30, 2012, now Pat. No. 9,980,167.

(51) Int. Cl.
*H04W 24/10*      (2009.01)
*H04L 5/00*      (2006.01)

(52) U.S. Cl.
CPC .......... *H04W 24/10* (2013.01); *H04L 5/0053* (2013.01); *H04L 5/0057* (2013.01); *H04L 5/0094* (2013.01)

(58) Field of Classification Search
CPC .......... H04J 11/00; H04J 1/00; H04L 1/0004; H04L 1/001; H04L 1/0026; H04L 1/0027;
(Continued)

(56) References Cited

U.S. PATENT DOCUMENTS

2007/0060146 A1   3/2007   Won et al.
2011/0021230 A1*  1/2011   Moberg ................ H04L 1/0027
                                                  455/507
(Continued)

FOREIGN PATENT DOCUMENTS

CN      102035631 A      4/2011
CN      102238747        11/2011
(Continued)

OTHER PUBLICATIONS

Chinese Office Action issued for CN201280073540.1 (English summary attached)—dated Jul. 30, 2018.
(Continued)

*Primary Examiner* — Kan Yuen
(74) *Attorney, Agent, or Firm* — Baker Botts, LLP (57) ABSTRACT

A radio network node (110) and a method therein for managing transmission of at least one channel quality report and a user equipment (120) a method therein for handling transmission of at least one channel quality report are disclosed. The radio network node (110) sends, to the user equipment (120), a first message comprising information about at least one resource for use by the user equipment (120) when transmitting the at least one channel quality report. The radio network mode (110) sends, to the user equipment (120), a second message for activating, in the user equipment (120), the transmission of the at least one channel quality report. The radio network node (110) receives, from the user equipment (120), a first channel quality report of the at least one channel quality report. The first channel quality report is received on the at least one resource on an uplink control channel.

14 Claims, 4 Drawing Sheets

(58) Field of Classification Search
CPC ....... H04L 1/1671; H04L 27/01; H04L 5/001; H04L 5/0053; H04L 5/0057; H04L 5/0094; H04W 24/10; H04W 72/04; H04W 72/0413; H04W 72/042; H04W 72/12

See application file for complete search history.

(56) References Cited

U.S. PATENT DOCUMENTS

| | | | |
|---|---|---|---|
| 2011/0081868 A1 | 4/2011 | Kim et al. | |
| 2011/0103335 A1* | 5/2011 | Golitschek Edler von Elbwart | H04L 1/0026 370/329 |
| 2011/0136495 A1* | 6/2011 | Chen | H04L 5/001 455/450 |
| 2011/0188393 A1* | 8/2011 | Mallik | H04B 7/024 370/252 |
| 2011/0269490 A1 | 11/2011 | Earnshaw et al. | |
| 2012/0082190 A1 | 4/2012 | Zhu et al. | |
| 2013/0039202 A1* | 2/2013 | Feuersanger | H04L 5/001 370/252 |
| 2013/0077596 A1* | 3/2013 | Liang | H04L 5/001 370/329 |
| 2013/0163527 A1* | 6/2013 | Lunttila | H04L 1/0026 370/329 |
| 2013/0322302 A1 | 12/2013 | Gholmieh et al. | |

FOREIGN PATENT DOCUMENTS

| | | |
|---|---|---|
| CN | 102307083 A | 1/2012 |
| CN | 102412941 | 4/2012 |
| EP | 2 360 864 A1 | 8/2011 |
| KR | 2009/0076784 | 7/2009 |
| WO | 2009/055804 | 4/2009 |
| WO | 2009/123520 | 10/2009 |
| WO | 2011085230 A3 | 7/2011 |

OTHER PUBLICATIONS

Rejection Decision issued by the Chinese Patent Office for Application No. CN 2012 80073540.1 (English summary attached)—dated Jan. 11, 2019.
3GPP TSG RAN WG1 Meeting #49bis; Orlando, Florida, USA; Source: Sharp; Title: Clarify UL physical channel scheduling for CGI Report (R1-072721)—Jun. 25-29, 2007.
3GPP TSG RAN WG1 Meeting #52bis; Shenzhen, China; Source: Sharp; Title: Further clarification for the periodic reporting on PUSCH (R1-081245)—Mar. 31-Apr. 4, 2008.
First Office Action issued by the Chinese Patent Office for Application No. 2012800735401 (English Summary attached)—Aug. 3, 2017.
Chinese Office Action received for Application No. CN 2012 80073540.1 (English translated summary attached)—Feb. 24, 2018.
3GPP TSG RAN1 #51bis; Sevilla, Spain; Source: Motorola: Title: Persistent Scheduling of CQI/PMI PUCCH Resources (R1-070435) Jan. 14- 18, 2008.
3GPP TSG RAN WG1 Meeting #49bis; Orlando, Florida; Source: Title: Clarify UL physical channel scheduling for CQI report (R1-072721) Jun. 25-29, 2007.
Supplementary European Search Report issued for application No. EP 12877778 dated Jun. 11, 2015.
EPO Communication pursuant to Article 94(3) EPC for Application No. 12 877 778.6-1854 dated Jul. 8, 2015.
PCT International Search Report for International Application No. PCT/CN2012/076256 dated Mar. 7, 2013.
3GPP TSG RAN Meeting #51 Kansas City, US; Title: New Work Item Proposal for LTE RAN Enhancements for Diverse Data Apolications (RP-110454) Mar. 15-19, 2011.
3rd Generation Partnership Project: Technical Specification Group Radio Access Network; Evolved Universal Terrestrial Radio Access (E-UTRA); Physical Layer Procedures (Release 8) 2008.
Chinese Office Action issued for Application No. 201910155266.6—dated Apr. 30, 2021.

\* cited by examiner

METHODS AND NETWORK NODES FOR MANAGING TRANSMISSION OF AT LEAST ONE CHANNEL QUALITY REPORT

PRIORITY

This application is a continuation, under 35 U.S.C. § 120, of U.S. patent application Ser. No. 14/399,231 filed on Nov. 6, 2014, which is a U.S. National Stan Filing under 35 § 371 of International Patent Application Serial No. PCT/CN2012/076256, filed May 30, 2012, and entitled "METHODS AND NETWORK NODES FOR MANAGING TRANSMISSION OF AT LEAST ONE CHANNEL QUALITY REPORT."

TECHNICAL FIELD

Embodiments herein relate to the field of telecommunications. In particular, a radio network node and a method therein for managing transmission of at least one channel quality report as well as a user equipment and a method therein for handling transmission of at least one channel quality report are disclosed.

BACKGROUND

With an increased number of smartphones in cellular communication networks, mobile network operators are confronted with various challenges. One challenge relates to how to provide an always-on-line experience for a very large number of smartphones, or in fact any type of user equipment.

As mentioned, the smartphone usage requires always-online experience for end users similar to PC-type programs. The always-on experience implies short reaction time for data arrival and data transmission. Therefore, one way to obtain this would be to maintain all smartphone users in RRC_CONNECTED state. The RRC CONNECTED state is known from Third Generation Partnership Project (3GPP) terminology and relates to Long Term Evolution (LTE) systems. However, maintaining all smartphones in RRC CONNECTED state may suffer from disadvantages such as that the smartphones would consume most periodic resources on Physical Uplink Control Channel (PUCCH). The number of smartphones may be very large, for example up to 65 536 smartphones as allowed by the Cell-Radio Network Temporary Identifier (C-RNTI) having 16 bits. With such large number of smartphones, the periodic resources on PUCCH will not suffice. However, most of the periodic resources are actually not used, because the always-on traffic only create chatty-like small packet in most of the time, e.g., background traffic, but not always continuous traffic flow, e.g., FTP traffic. A scenario like this is referred to as enhancement for Diverse Data Applications (eDDA) within 3GPP.

As an example, the periodic resources on PUCCH are consumed by a channel Quality Indicator (CQI) in a known LTE system. The CQI is reported periodically as configured by a base station. The CQI is for example used as input to channel adaptation in the base station. Channel adaptation relates to how for example modulation and coding schemes (MCS) are set in relation to quality of a channel.

A user equipment (UE) can be configured by Radio Resource Control (RRC) signalling to transmit CQI periodically on a specific PUCCH resource. The specific PUCCH resource has been configured by RRC signalling.

Back to the eDDA scenario, a problem is how to obtain CQI information in an efficient and flexible manner.

On one hand, if periodic CQI is enabled, the consumed amount of PUCCH resources would be large. Since most of the CQI information is not actually used, a disadvantage is that the CQI information often is unnecessary.

On the other hand, if periodic CQI is disabled, the downlink data flow can only use conservative modulation and coding schemes or re-transmission to match a desired transmission performance, since not enough CQI information is available to the base station.

In order to overcome this problem, a-periodic CQI reporting is also defined for 3GPP LTE systems. Specifically, a bit in an uplink grant may trigger a user equipment to transmit a channel quality report on a Physical Uplink Shared Channel (PUSCH). The channel quality report may be transmitted together with a data transmission or without a data transmission on PUSCH. A-periodic reporting of CQI is controlled by the base station, such as an eNodeB. In this manner, the CQI reports are sent when the uplink grant indicates that the user equipment shall send CQI information on PUSCH.

In order to save periodic CQI resources on PUCCH when a-periodic CQI on PUSCH is activated, a proposal suggests that the periodic CQI transmission is prohibited when a-periodic CQI on PUSCH is activated. Specifically, the transmission of periodic CQI report is cancelled during a predetermined time, when the user equipment has received a request for CQI on PUSCH from the base station. Thus, the user equipment makes sure that no periodic CQI is sent on PUCCH during the predetermined time if an uplink grant indicates that the user equipment shall send CQI information on PUSCH.

From the above, the CQI reporting mechanism can be said to be divided into two types, i.e. periodic CQI on PUCCH and a-periodic PUSCH.

Under the scenario of eDDA, as is analyzed above, periodic COI on PUSCH is not resource efficient enough to support the large number of always-on traffic, which occurs due to the usage of smartphones.

A-periodic CQI on PUSCH has disadvantages as well. Specifically, CQI information has to be sent by UE every time there is downlink data arrival at the user equipment. This is efficient when there is uplink data to be sent on PUSCH together with the CQI information to the base station. However, when there is no uplink data transmission, i.e., uni-directional downlink traffic, one uplink resource block containing only CQI information is not resource efficient.

SUMMARY

Therefore, an object is to provide a more efficient and flexible method for managing transmission of channel quality reports, such as CQI information mentioned above.

According to an aspect, the object is achieved by a method in a radio network node for managing transmission of at least one channel quality report from a user equipment. The radio network node sends a first message to the user equipment. The first message comprises information about at least one resource for use by the user equipment when transmitting the at least one channel quality report. Then, the radio network node sends, to the user equipment, a second message for activating, in the user equipment, the transmission of the at least one channel quality report. Furthermore, the radio network node receives, from the user equipment, a first channel quality report of the at least one channel quality report. The first channel quality report is received on the at least one resource on an uplink control channel.

According to another aspect, the object is achieved by a radio network node configured to manage transmission of at least one channel quality report from a user equipment, wherein the radio network node comprises a processing circuit configured to send, to the user equipment, a first message comprising information about at least one resource for use by the user equipment when transmitting the at least one channel quality report. Furthermore, the processing circuit is configured to send, to the user equipment, a second message for activating, in the user equipment, the transmission of the at least one channel quality report. Moreover, the processing circuit is configured to receive, from the user equipment, a first channel quality report of the at least one channel quality report. The first channel quality report is received on the at least one resource on an uplink control channel.

According to a further aspect, the object is achieved by a method in a user equipment for handling transmission of at least one channel quality report from the user equipment to a radio network node. The user equipment receives a first message from the radio network node. The first message comprises information about at least one resource for use by the user equipment when transmitting the at least one channel quality report. Next, the user equipment receives, from the radio network node, a second message for activating, in the user equipment, the transmission of the at least one channel quality report. Furthermore, the user equipment sends, to the radio network node, a first channel quality report of the at least one channel quality report. The first channel quality report is received on the at least one resource on an uplink control channel.

According to yet another aspect, the object is achieved by a user equipment configured to handle transmission of at least one channel quality report from the user equipment to a radio network node. The user equipment comprises a processing circuit configured to receive a first message from the radio network node. The first message comprises information about at least one resource for use by the user equipment when transmitting the at least one channel quality report. Moreover, the processing circuit is configured to receive, from the radio network node, a second message for activating, in the user equipment, the transmission of the at least one channel quality report. Furthermore, the processing circuit is configured to send, to the radio network node, a first channel quality report of the at least one channel quality report. The first channel quality report is received on the at least one resource on an uplink control channel.

According to embodiments herein, the radio network node sends the second message to the user equipment in order to manage, i.e. enable or disable the transmission of the at least one channel quality report. The second message, which activates/deactivates the transmission may be implemented as a new downlink control information format, a new medium access control (MAC) control element or a combination thereof. In this manner, resources of the control channel are temporarily occupied as determined by the second message which is sent by the radio network node. Therefore, the radio network node may flexibly manage the transmission of the at least one channel quality report by means of the second message. Moreover, the radio network node efficiently manages the transmission of the at least one channel quality report since the radio network node may instruct, by means of the second message, the user equipment to send the at least one channel quality report only when needed. As a result, flexible and efficient management of the transmission of the at least one channel quality report is obtained.

An advantage is that the embodiment herein follows the existing architecture of 3GPP LTE network, i.e. backward compatibility is enabled.

A further advantage is that the embodiments herein provides a solution which saves the PUCCH resources in case of the eDDA scenario described above.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar elements, network nodes, parts, items or features, when applicable. In the Figures, features that appear in some embodiments are indicated by dashed lines.

Figure 1:
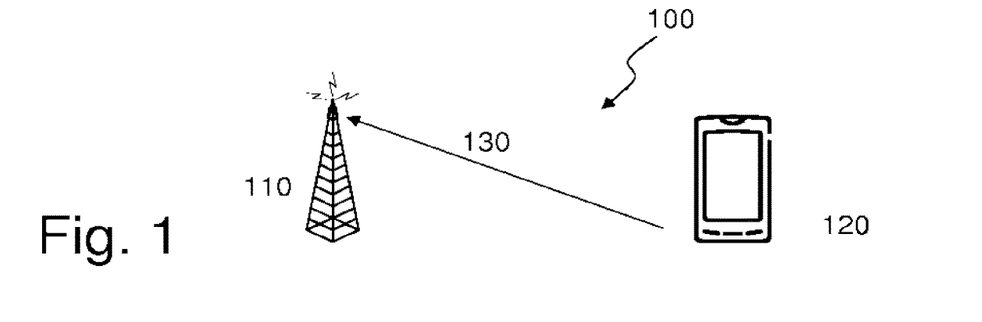
FIG. 1 is a schematic overview illustrating embodiments in an exemplifying radio communications system.

FIG. 1 shows a schematic overview of an exemplifying radio communication system 100, such as a LTE system, an LTE-Advanced system, a radio communication system evolved from an LTE system, a WiMax system or the like.

The radio communication system 100 comprises a radio network node 110, such as an evolved Node B, eNB, a control node controlling one or more Remote Radio Units (RRUs), a radio base station, an access point or the like.

Furthermore, a user equipment 120 is located in the vicinity of the radio network node 110. The user equipment 120 may send 130 channel quality reports, such as CQI reports known from 3GPP terminology, to the radio network node 110. The channel quality reports may be sent periodically or a-periodically on an uplink control channel, such as PUCCH.

The user equipment 120 may be a mobile phone, a cellular phone, a Personal Digital Assistant (FDA) equipped with radio communication capabilities, a smartphone, a laptop or personal computer (PC) equipped with an internal or external mobile broadband modem, a tablet PC, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

Figure 2:
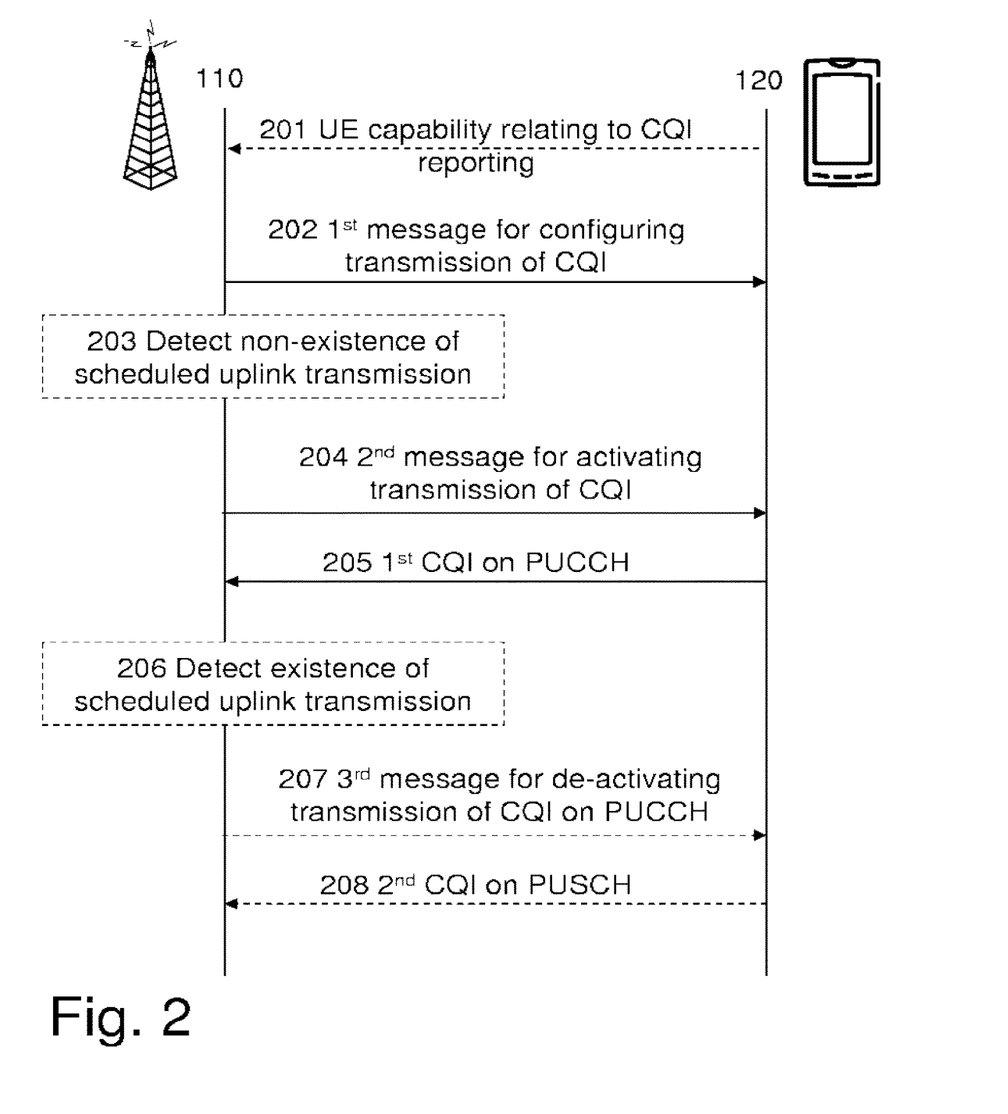
FIG. 2 is a schematic, combined signalling scheme and flowchart illustrating embodiments in the radio communication system according to FIG. 1.

FIG. 2 illustrates an exemplifying method for managing transmission of at least one channel quality report when implemented in the radio communication system 100 of FIG. 1. The radio network node 110 performs a method for managing transmission of the at least one channel quality report from the user equipment 120. The user equipment 120 performs a method for managing transmission of the at least one channel quality report.

A first message is used for configuring the user equipment 120 to transmit the at least one channel quality report. See action 202.

A second message is used for activating or de-activating the transmission of the at least one channel quality report. The second message may be implemented as a downlink control information (DCI) message or as a Medium Access Control Control Element (MAC CE) message.

Moreover, the transmission of channel quality reports refers to periodic or a-periodic transmission of channel quality reports.

Thus, four different embodiments according to the following will be referred to when describing FIG. 2.

According to a first set of embodiments, the transmission of channel quality reports refers to periodic transmission of channel quality reports and the second message is implemented as a DCI message.

According to a second set of embodiments, the transmission of channel quality reports refers to periodic transmission of channel quality reports and the second message is implemented as a MAC CE message.

According to a third set of embodiments, the transmission of channel quality reports refers to a-periodic transmission of channel quality reports and the second message is implemented as a DCI message.

According to a fourth set of embodiments, the transmission of channel quality reports refers to a-periodic transmission of channel quality reports and the second message is implemented as a MAC CE message.

The following actions may be performed in any suitable order.

In order to the radio network node 110 to be aware of functionality in the user equipment 120, the radio network node 110 may receive, from the user equipment 120, a capability message for indicating the user equipment's 120 capability relating to transmission of the at least one channel quality report.

In the first and second sets of embodiments, the capability message indicates that the user equipment 120 is capable of managing, i.e. enable or disable, the transmission of periodic channel quality reports.

In the third and fourth sets of embodiments, the capability message indicates that the user equipment 120 is capable of managing, i.e. enable or disable, the transmission of a-periodic channel quality reports.

In the first and third sets of embodiments, the capability message indicates that the user equipment 120 is capable of receiving a DCI message for managing the transmission of channel quality reports. This applies to both periodic and a-periodic channel quality reports.

In the second and fourth sets of embodiments, the capability message indicates that the user equipment 120 is capable of receiving a MAC CE message for managing the transmission of channel quality reports. This applies to both periodic and a-periodic channel quality reports.

The capability message may be an RRC message in a format UECapabilityInformation which is known from 3GPP terminology. The UECapabilityInformation may be modified to include information as given above for the capability message according to the first to fourth sets of embodiments.

Action 202

The radio network node 110 sends a first message to the user equipment 120. In this manner, the user equipment 120 is configured with information about how to transmit the at least one channel quality report. The first message comprises information about at least one resource for use by the user equipment 120 when transmitting the at least one channel quality report. The first message may be a modified information element (IE) according to CQI-ReportConfig defined in 3GPP for LTE networks.

In more detail, as soon as RRC connection with the radio communication system 100 is completed, physical layer configuration parameters is sent to the UE. The physical layer parameters include the CQI resource configuration on PUCCH, e.g., the IE of CQI-ReportConfig defined in 3GPP LTE networks.

In some examples, the first message solely configures the user equipment 120 with the information, i.e. the first message do not activate the transmission of the at least one channel quality report. In other examples, a separate field in the first message indicates whether or not to start transmission once configuration is completed. If the separated field indicates that transmission is disabled, the transmission of the at least one channel quality report may not occur until the second message is received as described in action 204.

The at least one resource may indicate subframes allocated to periodic transmission of the at least one channel quality report or a resource block index for the uplink control channel.

As an example, according to the first and second sets of embodiments, the at least one resource indicates subframes allocated to, or designated for, periodic transmission. In this manner, a CQI period is defined thanks to that the indicated subframes are repeated in each radio frame. The CQI period indicates how often a channel quality report shall be sent to the radio network node 110 in case of periodic transmission of channel quality reports. According to 3GPP terminology, a radio frame, having a duration of 10 milliseconds, comprises 10 subframes.

As another example, according to the third and fourth sets of embodiments, the at least one resource indicates the resource block index for the uplink control channel. Thus, when the user equipment 120 is instructed, by the second message, to send an a-periodic channel quality report to the radio network node 110, the user equipment 120 allocates the channel quality report, on the uplink control channel, to the resource black indicated by the resource block index.

According to the first and second sets of embodiments, a second indication specifies a time period during which the periodic transmission is activated. The second indication may be comprised in the first message. In this manner, the time period during which the periodic transmission may be set by the radio network node 110. Thus, the radio network node 110 need not explicitly disable the transmission of the at least one channel quality report as in for example action 207.

Action 203

According to the first and second sets of embodiments, the radio network node 110 may detect non-existence of scheduled uplink (UL) transmission in a first subframe of the subframes. Non-existence of scheduled uplink transmission refers to that the radio network node 110 has not scheduled any uplink data to be transmitted by the user equipment 120 to the radio network node 110 in the first subframe. Then, action 204 below may be performed only in response to the detecting of non-existing scheduled uplink transmission.

In this manner, periodic PUCCH is used when no uplink data is present. Thereby, waste of PUSCH resources is avoided in case a-periodic transmission of the at least one channel quality report would be transmitted in PUSCH as in prior art.

Action 204

In order for the radio network node 110 to manage, i.e. enable or disable, transmission of the at least one channel quality report, the radio network node 110 sends a second message to the user equipment 120. The second message is used for activating, in the user equipment 120, the transmission of the at least one channel quality report.

As mentioned above, the second message may be implemented as a downlink control information (DCI) message or as a Medium Access Control Control Element (MAC CE) message. As an example, the second message comprises DCI configured to indicate activation of periodic or a-periodic transmission of the at least one channel quality report. Alternatively, the second message comprises a MAC CE configured to indicate activation of periodic or a-periodic transmission of the at least one channel quality report.

In some embodiments, the second message may comprise a first indication for activating periodic or a-periodic transmission of the at least one channel quality report.

According to the first and third set of embodiments, the DCI message is designated to activate, or trigger, transmission of the at least one channel quality report. The at least one channel quality report is sent according to information in the first messages, i.e. as configured during action 202. For example, the at least one channel quality report is sent on uplink control channel locations, such as subframes or resource block index, as configured in action 202. As an example, the DCI message may be in the form of a new DCI format including the first indication.

According to the second and fourth set of embodiments, the MAC GE message is designated to activate, or trigger, transmission of the at least one channel quality report. As mentioned, the at least one channel quality report is sent according to information in the first messages, i.e. as configured during action 202. For example, the at least one channel quality report is sent on uplink control channel locations, such as subframes or resource block index, as configured in action 202. As an example, the MAC CE message may be in the form of a new MAC CE format including the first indication. In order to full exploit the downlink resource block used for carrying the MAC CE message, the MAC CE message may be sent along with some downlink data.

According to the first and second sets of embodiments, a second indication specifies a time period during which the periodic transmission is activated, or enabled. The second indication may be comprised in the second message. In this manner, the time period, during which the periodic transmission may be enabled, may be set by the radio network node 110. Thus, as mentioned, the radio network node 110 need not explicitly disable, or de-activate, the transmission of the at least one channel quality report as in for example action 207.

Action 205

When the transmission of the at least one channel quality report has been activated in action 204, the radio network node 110 receives a first channel quality report of the at least one channel quality report from the user equipment 120. The first channel quality report is received on the at least one resource on an uplink control channel. The at least one resource may have been configured in action 202.

In case of uni-directional downlink transmission, waste of PUSCH resources is avoided thanks to the use of the uplink control channel for sending the at least one channel quality report.

Only those user equipments that are required to send a channel quality report on the uplink control channel, e.g. PUCCH, sends the first channel quality report as indicated by the second message. Therefore, in case of periodic transmission with a large number of active user equipments connected to the radio network node, limitations in number of possible channel quality reports due to limited uplink control channel resources, such as PUCCH resources, are avoided.

With reference to action 206-208 below, it may be beneficial to de-activate periodic transmission of CQI reports on PUCCH during specific conditions. For example, a-periodic CQI on PUSCH is beneficial when the a-periodic COI report is sent together with other data on PUSCH.

Action 206

In order to identify the specific conditions, the radio network node 110 may detect existence of scheduled uplink transmission in a second subframe of the subframes. That is to say, the specific condition is that there has been scheduled uplink transmission in the second subframe in which also a periodic CQI report is configured to be transmitted. This means that the second subframe coincides with configured periodic transmission of CQI. When the specific condition is fulfilled, action 207 may be performed.

Action 207

Again, this action may be performed in response to the detection in action 206.

The radio network node 110 may send a third message to the user equipment 120. The third message is indicative of de-activation, in the user equipment 120, of the periodic transmission of the channel quality reports. As an example, the user equipment 120 may in response to the third message cancel any pending periodic transmissions of channel quality reports on PUCCH. Then, the user equipment 120 may activate transmissions of channel quality reports on PUSCH.

The third message may be a DCI message or a MAC CE message similarly to the second message as explained above.

Action 208

The radio network node 110 may receive a second channel quality report of the at least one channel quality report from the user equipment 120. The second channel quality report may be received in the second subframe on an uplink shared channel. Hence, in this manner a-periodic CQI reporting on PUSCH is activated when there is uplink data scheduled to the second subframe in which periodic reporting on PUCCH would occur according to configuration in action 202. CQI reporting refers to the transmission of the at least one channel quality report.

In the embodiments described above, the CQI reporting on PUCCH may be disabled when there is no downlink (DL) data arrival, in order to save PUCCH resources. The CQI reporting may be activated by the downlink control information in physical layer, e.g. DCI defined in 3GPP LTE system, when it is necessary In FIGS. 3-4, transmission of CQI reports in a LTE system according to prior art is shown.

Figure 3:
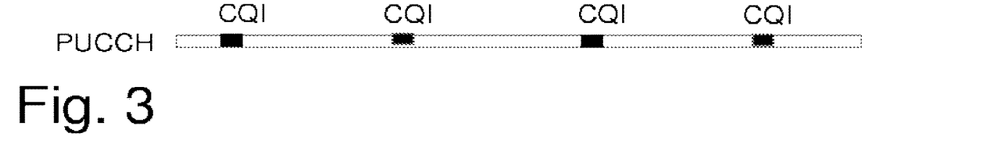
FIG. 3 is an illustration of periodic CQI on PUCCH as implemented in an LTE system according to prior art.

FIG. 3 shows periodic CQI reporting on PUCCH according to prior art.

Figure 4:
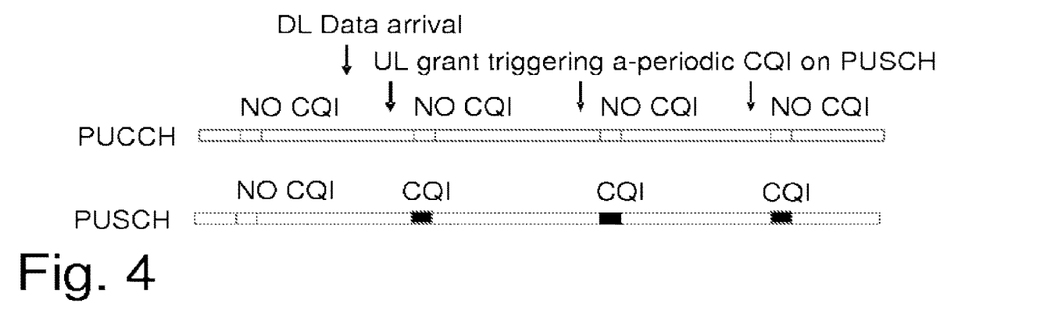
FIG. 4 is an illustration of a-periodic CQI on PUSCH as implemented in an LTE system according to prior art.

FIG. 4 shows a-periodic CQI reporting on PUSCH according to prior art.

Figure 5:
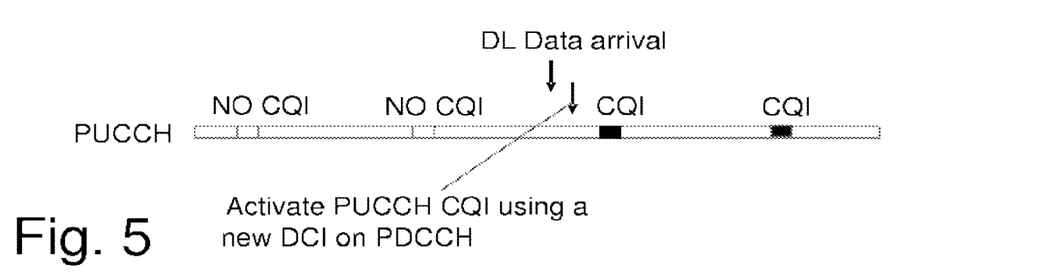
FIG. 5 is an illustration of CQI transmission on PUCCH while using a DCI format to trigger transmission of the CQI report.

FIG. 5 shows the first set of embodiments in which a DCI message is used to trigger the transmission of the channel quality report. Specifically, before or at the same time of a first DL data transmission, the DCI is sent to trigger the CQI reporting on PUCCH. In this way, the periodic CQI resources on PUCCH, which should have been occupied by a single UE according to the current LTE protocol, can be improved to be reused by multiple UEs in a more efficient manner.

Figure 6:
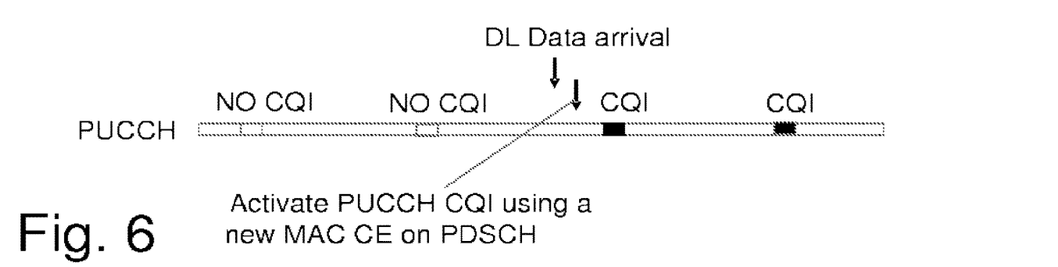
FIG. 6 is an illustration of CQI transmission on PUCCH while using a MAC CE to trigger transmission of the CQI report.

FIG. 6 shows the second set of embodiments in which a MAC CE on Physical Downlink Shared Channel (PDSCH) is used to trigger the transmission of the channel quality report. In this embodiment, the CQI reporting on PUCCH would be disabled when there is no DL data arrival, in order to save the limited PUCCH resources, but would be activated by the downlink control element in MAC layer, e.g., MAC CE (Control Element) defined in 3GPP LTE system, when it is necessary. Specifically, along with the first TB of DL data transmission, the MAC CE is sent to trigger the CQI reporting in PUCCH. In this way, the periodic CQI resources on PUCCH, which should have been occupied by a single UE according to the current LTE protocol, can be improved to be reused by multiple UEs in a more efficient manner.

The DCI message used to activate CQI reporting may be implemented in different ways.

As a first example, a new DCI format may be defined besides the existing DCI format. This may cause modifications to the current standard, but provide more feasibility, e.g., the time period may be defined and the CQI reporting may be triggered for a set of UEs.

As a second example, an existing DCI format may be utilized. This would cause little or no modifications to the current standard. A possible solution in the 3GPP LTE scenario is to use DCI format 1A, which is used by all DL transmission modes. Specifically, a combination of New Data Indication (NDI) field is toggled and redundancy version field equal to 1 can be used to indicate that the CQI report is to be transmitted. Similarly, a combination of that the NDI field is toggled and that the redundancy version field is equal to zero, can be used to indicated that no CQI report is to be transmitted.

Similarly, the MAC CE message may be implemented in different ways.

As a first example, a new format of MAC CE may be defined more easily compared to a new DCI format. E.g., more reserved fields in logical channel ID (LCID) in LTE may be used.

A combination of DCI message and MAC CE message may also be implemented. Implementing the second message as a DCI message is more resource efficient than using a MAC CE message. Yet, a MAC CE message is beneficial in that PDCCH resources are saved.

The deactivation of periodic CQI reporting may be implemented in different ways.

As a first example, event triggered, i.e. a further DCI message may be used to indicate the end of CQI reporting.

As a second example, time triggered, i.e. the DCI message used to activate the CQI reporting comprises the time period mentioned above. The time period defines the duration of the CQI reporting. In this manner, the reporting would be ended automatically when the time period has expired. The time period may be decided based on the downlink data traffic type. In further examples, a combination of the first and second example may be implemented.

A combination of these two examples may also be used.

Similarly, there are two types of deactivation of periodic CQI reporting when MAC CE is used. Similarly to the above, there are event triggered and time triggered schemes. Furthermore, with the MAC Cu message it is easier to include more specific fields to explore the functionality of CQI reporting command. For example, some parameters of the first message, which is used for CQI resource configuration in action 202, may be overridden by the MAC CE message. The parameters that may be overridden include fix example the time period and the resource block index.

Figure 7:
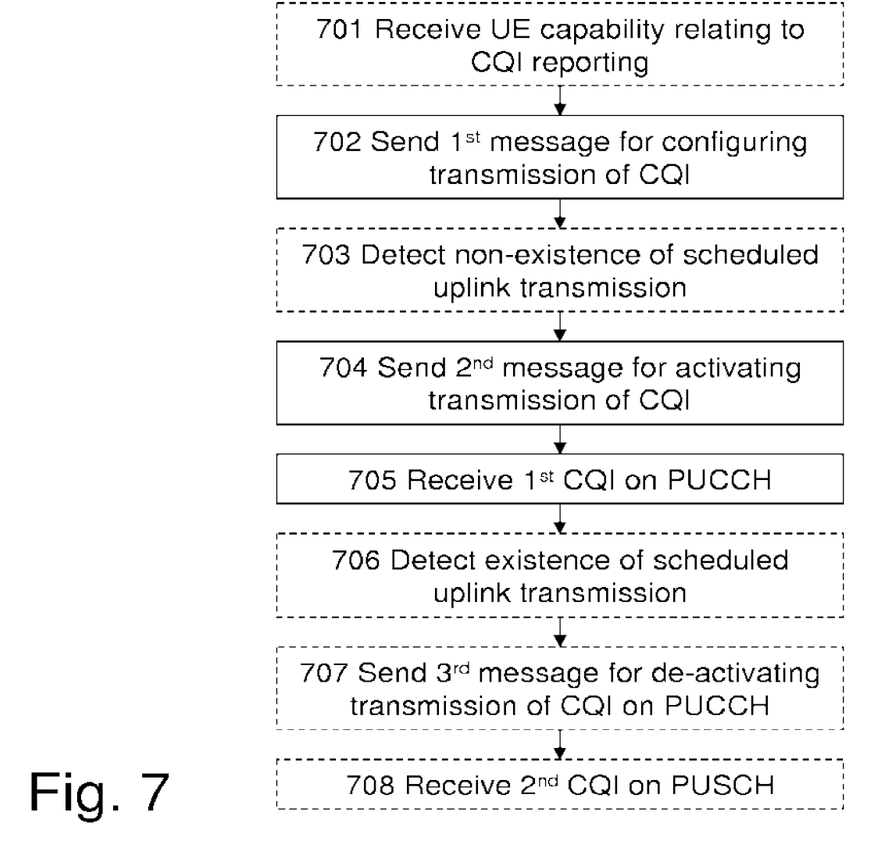
FIG. 7 is a schematic flowchart illustrating the methods of FIG. 2 when seen from the radio network node.

In FIG. 7, an exemplifying, schematic flowchart of the methods of FIG. 2 when seen from the radio network node 110 is shown. As mentioned, the radio network node 110 performs a method for managing transmission of at least one channel quality report from a user equipment 120.

Again, the second message may comprise a first indication for activating periodic or a-periodic transmission of the at least one channel quality report. Then, the second message may comprise downlink control information which comprises the first indication, or a medium access control element, "MAC CE", which comprises the first indication. The at least one resource indicates subframes allocated to periodic transmission of the at least one channel quality report, or a resource block index for the uplink control channel. Also mentioned, a second indication may specify a time period during which the periodic transmission is activated. The second indication may be comprised in the first message or the second message.

The following actions may be performed in any suitable order.

Action 701

The radio network node 110 may receive, from the user equipment 120, a capability message for indicating the user equipment's 120 capability relating to transmission of the at least one channel quality report. This action is similar to action 201.

Action 702

The radio network node 110 sends, to the user equipment 120, a first message comprising information about at least one resource for use by the user equipment 120 when transmitting the at least one channel quality report. This action is similar to action 202.

Action 703

The radio network node 110 may detect non-existence of scheduled uplink transmission in a first subframe of the subframes, wherein the sending 204 of the second message is performed only in response to the detecting 203 of non-existing scheduled uplink transmission. This action is similar to action 203.

Action 704

The radio network node 110 sends, to the user equipment 120, a second message for activating, in the user equipment 120, the transmission of the at least one channel quality report. This action is similar to action 204.

Action 705

The radio network node 110 receives, from the user equipment 120, a first channel quality report of the at least one channel quality report. The first channel quality report is received on the at least one resource on an uplink control channel. This action is similar to action 205.

Action 706

The radio network node 110 may detect existence of scheduled uplink transmission in a second subframe of the subframes. This action is similar to action 206.

Action 707

The radio network node 110 may send, to the user equipment 120, a third message for de-activating in the user equipment 120 the periodic transmission of the channel quality reports. This action is similar to action 207.

Action 708

The radio network node 110 may receive, from the user equipment 120, a second channel quality report of the at least one channel quality report, wherein the second channel quality report is received in the second subframe on an uplink shared channel. This action is similar to action 208.

Figure 8:
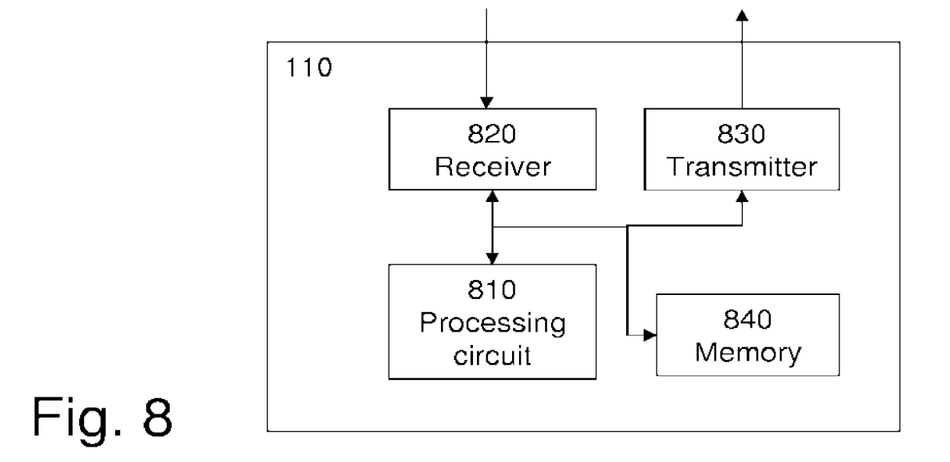
FIG. 8 is a schematic block diagram illustrating an exemplifying radio network node configured to perform the methods illustrated in FIG. 2 and/or 7.

With reference to FIG. 8, a schematic block diagram of the radio network node 110 is shown. The radio network node 110 is configured to perform the methods in FIG. 2 and/or 7. Thus, the radio network node 110 is configured to manage transmission of at least one channel quality report from a user equipment 120.

As mentioned, the second message may comprise a first indication for activating periodic or a-periodic transmission of the channel quality reports. The second message may comprise downlink control information, which comprises the first indication or the second message comprises a medium access control element, "MAC CE", which comprises the first indication. The at least one resource may indicate subframes allocated to periodic transmission of the at least one channel quality report, or a resource block index for the uplink control channel. The second indication may specify a time period during which the periodic transmission is activated. The second indication may be comprised in the first message or the second message.

The radio network node 110 comprises a processing circuit 810 configured to send, to the user equipment 120, a first message comprising information about at least one resource for use by the user equipment 120 when transmitting the at least one channel quality report. Moreover, the processing circuit is configured to send, to the user equipment 120, a second message for activating, in the user equipment 120, the transmission of the at least one channel quality report. Additionally, the processing circuit 810 is configured to receive, from the user equipment 120, a first channel quality report of the at least one channel quality report, wherein the first channel quality report is received on the at least one resource on an uplink control channel.

The processing circuit 810 may further be configured to detect non-existence of scheduled uplink transmission in a first subframe of the subframes. The processing circuit 810 may further be configured to send the second message only in response to the detection of non-existing scheduled uplink transmission.

The processing circuit 810 may further be configured to: detect existence of scheduled uplink transmission in a second subframe of the subframes; send, to the user equipment 120, a third message for de-activating in the user equipment 120 the periodic transmission of the channel quality reports; and receive, from the user equipment 120, a second channel quality report of the at least one channel quality report, wherein the second channel quality report is received in the second subframe on an uplink shared channel.

The processing circuit 810 may further be configured to receive, from the user equipment 120, a capability message for indicating the user equipment's 120 capability relating to transmission of the at least one channel quality report.

The processing circuit 810 may be a processing unit, a processor, an application specific integrated circuit (ASIC), a field-programmable gate array (FPGA) or the like. As an example, a processor, an ASIC, an FPGA or the like may comprise one or more processor kernels.

The radio network node 110 further comprises a receiver 820, which may be configured to receive information, such as the at least one channel quality report, the first channel quality report, the second channel quality report and/or the like as described herein. The configuration of the receiver may be controlled by the processing circuit 810.

The radio network node 110 further comprises a transmitter 830, which may be configured to transmit information, such as the first message, the second message, the third message and/or the like as described herein. The configuration of the transmitter may be controlled by the processing circuit 810.

The radio network node 110 further comprises a memory 840 for storing software to be executed by, for example, the processing circuit. The software may comprise instructions to enable the processing circuit to perform the method in the radio network node 110 as described above in conjunction with FIG. 2 and/or FIG. 7.

Moreover, the memory 840 may be used for storing information, such as the first message, the second message, the third message, the channel quality reports and/or the like as described herein.

The memory 840 may be a hard disk, a magnetic storage medium, a portable computer diskette or disc, flash memory, random access memory (RAM) or the like. Furthermore, the memory may be an internal register memory of a processor.

Figure 9:
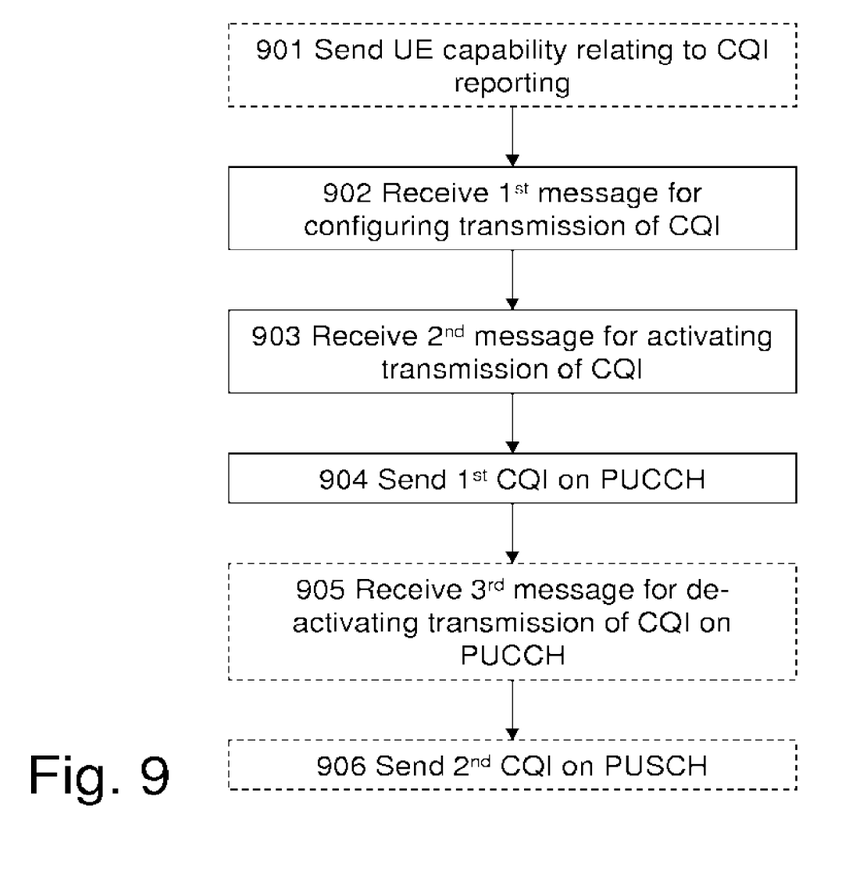
FIG. 9 is a schematic flowchart illustrating the methods of FIG. 2 when seen from the user equipment.

In FIG. 9, an exemplifying, schematic flowchart of the methods of FIG. 2 when seen from the user equipment 120 is shown. As mentioned, the user equipment 120 performs a method for handling transmission of at least one channel quality report from the user equipment 120 to the radio network node 110.

Again, the second message may comprise a first indication for activating periodic or a-periodic transmission of the channel quality reports, wherein the second message may comprise downlink control information, which comprises the first indication; or the second message may comprise a medium access control element, "MAC CE", which comprises the first indication. The at least one resource may indicate subframes allocated to periodic transmission of the at least one channel quality report, or a resource block index for the uplink control channel. The second indication may specify a time period during which the periodic transmission is activated. The second indication may be comprised in the first message or the second message.

The following actions may be performed in any suitable order.

Action 901

The user equipment 120 may send, to the radio network node 110, a capability message far indicating the user equipment's 120 capability relating to transmission of the at least one channel quality report. This action is similar to action 201.

Action 902

The user equipment 120 receives, from the radio network node 110, a first message comprising information about at least one resource for use by the user equipment 120 when transmitting the at least one channel quality report. This action is similar to action 202.

Action 903

The user equipment 120 receives, from the radio network node 110, a second message for activating, in the user equipment 120, the transmission of the at least one channel quality report. This action is similar to action 204.

Action 904

The user equipment 120 sends, to the radio network node 110, a first channel quality report of the at least one channel quality report, wherein the first channel quality report is received on the at least one resource on an uplink control channel. This action is similar to action 205.

Action 905

The user equipment 120 may receive, from the radio network node 110, a third message for de-activating in the user equipment 120 the periodic transmission of the channel quality reports. This action is similar to action 207.

Action 906

The user equipment 120 may send, to the radio network node 110, a second channel quality report of the at least one channel quality report, wherein the second channel quality report is received in the second subframe on an uplink shared channel. This action is similar to action 208.

Figure 10:
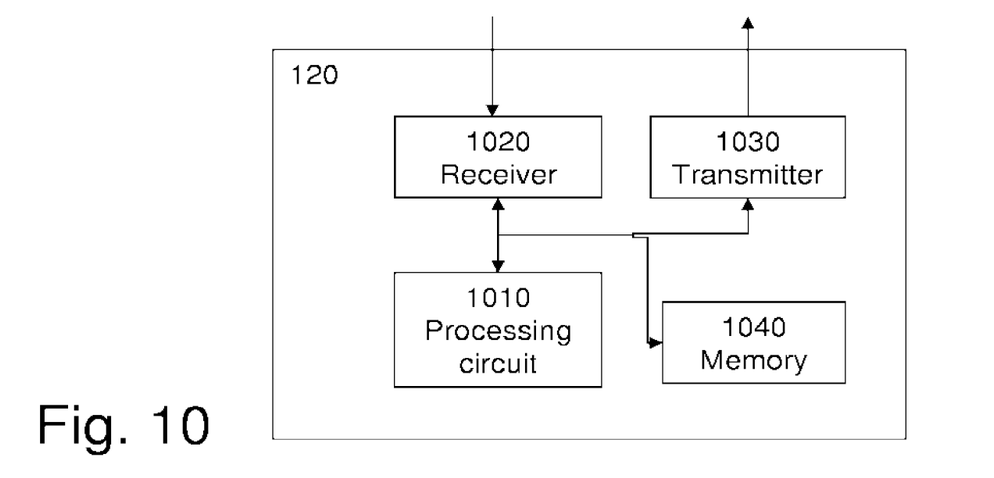
FIG. 10 is a schematic block diagram illustrating an exemplifying user equipment configured to perform the methods illustrated in FIG. 2 and/or 9.

With reference to FIG. 10, a schematic block diagram of the user equipment 120 is shown. The user equipment 120 is configured to perform the methods in FIG. 2 and/or 9. Thus, the user equipment 120 is configured to handle transmission of at least one channel quality report from the user equipment 120 to the radio network node 110

As mentioned, the second message may comprise a first indication for activating periodic or a-periodic transmission of the channel quality reports, wherein: the second message comprises downlink control information, which comprises the first indication; or the second message comprises a medium access control element, "MAC CE", which comprises the first indication. The at least one resource may indicate subframes allocated to periodic transmission of the at least one channel quality report, or a resource block index for the uplink control channel. The second indication may specify a time period during which the periodic transmission is activated. The second indication may be comprised in the first message or the second message.

The user equipment 120 comprises a processing circuit 1010 configured to receive, from the radio network node 110, a first message comprising information about at least one resource for use by the user equipment 120 when transmitting the at least one channel quality report. Furthermore, the processing circuit 1010 is configured to receive, from the radio network node 110, a second message for activating, in the user equipment 120, the transmission of the at least one channel quality report. Moreover, the processing circuit 1010 is configured to send, to the radio network node 110, a first channel quality report of the at least one channel quality report, wherein the first channel quality report is received on the at least one resource on an uplink control channel.

The processing circuit 1010 may further be configured to receive, from the radio network node 110, a third message for de-activating in the user equipment 120 the periodic transmission of the channel quality reports. Additionally, the processing circuit 1010 may further be configured to send, to the radio network node 110, a second channel quality report of the at least one channel quality report, wherein the second channel quality report is received in the second subframe on an uplink shared channel.

The processing circuit 1010 may further be configured to send, to the radio network node 110, a capability message for indicating the user equipment's 120 capability relating to transmission of the at least one channel quality report.

The user equipment 120 further comprises a receiver 1020, which may be configured to receive information, such as the first message, the second message, the third message and/or the like as described herein. The configuration of the receiver may be controlled by the processing circuit 1010.

The user equipment 120 further comprises a transmitter 1030, which may be configured to transmit information, such as the at least one channel quality report, the first channel quality report, the second channel quality report and/or the like as described herein. The configuration of the transmitter may be controlled by the processing circuit 1010.

The user equipment 120 further comprises a memory 1040 for storing software to be executed by, for example, the processing circuit. The software may comprise instructions to enable the processing circuit to perform the method in the user equipment 120 as described above in conjunction with FIG. 2 and/or FIG. 9.

Moreover, the memory 1040 may be used for storing information, such as the first message, the second message, the third message, the channel quality reports and/or the like as described herein.

The memory 1040 may be a hard disk, a magnetic storage medium, a portable computer diskette or disc, flash memory, random access memory (RAM) or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a radio network node, wherein the method comprises:
    sending, to a user equipment, a first message comprising information about a resource for use by the user equipment when transmitting channel quality reports, the resource is for periodic transmission of the channel quality reports on a physical uplink control channel (PUCCH);
    sending, to the user equipment, a second message for activation, in the user equipment, the periodic transmission of the channel quality reports on the PUCCH using the resource identified in the first message;
    receiving, from the user equipment, at least a first channel quality report and a second channel quality report, wherein the first channel quality report and the second channel quality report are received on the PUCCH resource;
    detecting existence of scheduled uplink transmission in a subframe;
    based on the detected existence of scheduled uplink transmission in a subframe, sending, to the user equipment, a third message for deactivating, in the user equipment, the periodic transmission of the channel quality reports on the PUCCH; and
    after sending the third message for deactivation in the user equipment the periodic transmission of the channel quality reports on the PUCCH, receiving, from the user equipment, a third channel quality report on the physical uplink shared channel (PUCCH), and
    wherein the first or the second message comprises a first indication specifying a time period during which the periodic transmission is activated.

2. The method according to claim 1, wherein the second message comprises a second indication for the activation of the periodic transmission of the channel quality reports, wherein
    the second message comprises downlink control information, which comprises the second indication.

3. The method according to claim 1, wherein the second message comprises a second indication for the activation of the periodic transmission of the channel quality reports, wherein the second message comprises a medium access control element, MAC CE, which comprises the second indication.

4. The method according to claim 1, further comprising:
receiving, from the user equipment, a capability message for indicating the user equipment's capability relating to periodic or a-periodic transmission of the channel quality reports.

5. A radio network node comprising:
memory storing instructions; and
a processing circuit operable to execute the instructions to cause the radio network node to:
send, to a user equipment, a first message comprising information about a resource for use by the user equipment when transmitting channel quality reports, the first message is for periodic transmission of the channel quality reports on a physical uplink control channel, PUCCH;
send, to the user equipment, a second message for activation, in the user equipment, the periodic transmission of the channel quality reports by the user equipment on the PUCCH using the resource identified in the first message;
receive at least a first channel quality report and a second channel quality report from the user equipment, wherein the first channel quality report and the second channel quality report are received on the PUCCH resource informed in the first message;
detect existence of scheduled uplink transmission in a subframe;
based on the detected existence of scheduled uplink transmission in a subframe, send a third message for deactivating, in the user equipment, the periodic transmission of the channel quality reports by the user equipment on the PUCCH; and
after sending the third message for deactivation in the user equipment the periodic transmission of the channel quality reports on the PUCCH, receiving, from the user equipment, a third channel quality report on the physical uplink shared channel (PUSCH), and
wherein the first or the second message comprises a first indication specifying a time period during which the periodic transmission is activated.

6. The radio network node according to claim 5, wherein the second message comprises a second indication for initiating the activation of the periodic transmission of the channel quality reports, wherein:
the second message comprises downlink control information, which comprises the second indication.

7. The radio network node according to claim 5, wherein the second message comprises a second indication for initiating the activation of the periodic transmission of the channel quality reports, wherein:
the second message comprises a medium access control element, MAC CE, which comprises the second indication.

8. A method in a user equipment for transmission of channel quality reports from the user equipment to a radio network node, wherein the method comprises:
receiving, from the radio network node, a first message comprising information about a resource for use by the user equipment when transmitting the channel quality reports, the resource is for periodic transmission of the channel quality reports by the user equipment on a physical uplink control channel, PUCCH;
receiving, from the radio network node, a second message for activation, in the user equipment, of the periodic transmission of the channel quality reports on the PUCCH using the resource identified in the first message;
sending, to the radio network node, a first channel quality report and a second channel quality report on the PUCCH resource indicated in the first message;
based on a scheduled uplink transmission in a subframe, receiving, from the radio network node, a third message for deactivating, in the user equipment, the periodic transmission of the channel quality reports on the PUCCH; and
after receiving the third message for deactivation in the user equipment the periodic transmission of the channel quality reports on the PUCCH, transmitting, to the network node, a third channel quality report on the physical uplink shared channel (PUSCH) along with the scheduled uplink transmission in the subframe, and
wherein the first or the second message comprises a first indication specifying a time period during which the periodic transmission is activated.

9. The method according to claim 8, wherein the second message comprises a second indication for initiating the activation of the periodic transmission of the channel quality reports, wherein:
the second message comprises downlink control information, which comprises the second indication.

10. The method according to claim 8, wherein the second message comprises a second indication for initiating the activation of the periodic transmission of the channel quality reports, wherein:
the second message comprises a medium access control element, MAC CE, which comprises the first indication.

11. The method according to claim 8, further comprising:
sending, to the radio network node, a capability message for indicating the user equipment's capability relating to periodic or a-periodic transmission of the channel quality reports.

12. A user equipment configured to transmit channel quality reports from the user equipment to a radio network node, wherein the user equipment comprises:
memory storing instructions; and
a processing circuit operable to execute the instructions to cause the user equipment to:
receive, from the radio network node, a first message comprising information about a resource for use by the user equipment when transmitting the channel quality reports, the resource is for periodic transmission of the channel quality reports by the user equipment on a physical uplink control channel, PUCCH;
receive, from the radio network node, a second message for initiating activation, in the user equipment, the periodic transmission of the channel quality reports on the PUCCH using the resource identified in the first message;
send, to the radio network node, a first channel quality report and a second channel quality report on PUCCH resource received in the first message;
based on a scheduled uplink transmission in a subframe, receive, from the radio network node, a third message for deactivating, in the user equipment, the periodic transmission of the channel quality reports on the PUCCH; and after receiving the third message for deactivation in the user equipment the periodic transmission of the channel quality reports on the PUCCH, transmitting, to the network node, a third channel quality report on the physical uplink shared channel (PUSCH) along with the scheduled uplink transmission in the subframe, and wherein the first or the second message comprises a first indication specifying a time period during which the periodic transmission is activated.

13. The user equipment according to claim 12, wherein the second message comprises a second indication for initiating the activation of the periodic transmission of the channel quality reports, wherein:

the second message comprises downlink control information, which comprises the second indication.

14. The user equipment according to claim 12, wherein the second message comprises a second indication for initiating the activation of the periodic transmission of the channel quality reports, wherein:

the second message comprises a medium access control element, "MAC CE", which comprises the first indication.

* * * * *

UNITED STATES PATENT AND TRADEMARK OFFICE
CERTIFICATE OF CORRECTION

PATENT NO. : 11,323,901 B2  
APPLICATION NO. : 15/965157  
DATED : May 3, 2022  
INVENTOR(S) : Lu et al.

Page 1 of 2

It is certified that error appears in the above-identified patent and that said Letters Patent is hereby corrected as shown below:

On the Title Page

In Column 1, under "Notice", Line 4, insert -- This patent is subject to a terminal disclaimer. --.

Item (45), under "Date of Patent", in Column 2, Line 1, delete "May 3, 2022" and insert -- * May 3, 2022 --, therefor.

On Page 2, item (56), under "OTHER PUBLICATIONS", in Column 2, Line 6, delete "CGI" and insert -- CQI --, therefor.

In the Specification

In Column 1, Line 9, delete "2014," and insert -- 2014, now Pat. No. 9,980,167, --, therefor.

In Column 2, Line 36, delete "COI on PUSCH" and insert -- CQI on PUCCH --, therefor.

In Column 4, Line 63, delete "(FDA)" and insert -- (PDA) --, therefor.

In Column 5, Line 45, below "order." insert -- Action 201 --, as a sub-heading.

In Column 6, Line 55, delete "black" and insert -- block --, therefor.

In Column 7, Line 45, delete "MAC GE" and insert -- MAC CE --, therefor.

In Column 8, Line 25, delete "COI" and insert -- CQI --, therefor.

In Column 10, Line 8, delete "MAC Cu" and insert -- MAC CE --, therefor.

In Column 10, Line 14, delete "fix" and insert -- for --, therefor.

Signed and Sealed this  
Twenty-third Day of August, 2022

Katherine Kelly Vidal  
*Director of the United States Patent and Trademark Office*

CERTIFICATE OF CORRECTION (continued)
U.S. Pat. No. 11,323,901 B2

In Column 12, Line 55, delete "far" and insert -- for --, therefor.

In the Claims

In Column 14, Line 58, in Claim 1, delete "(PUCCH)," and insert -- (PUSCH), --, therefor.